United States Patent
Chambliss et al.

(10) Patent No.: US 10,318,325 B2
(45) Date of Patent: Jun. 11, 2019

(54) HOST-SIDE CACHE MIGRATION

(71) Applicant: International Business Machines Corporation, Armonk, NY (US)

(72) Inventors: David D. Chambliss, Morgan Hill, CA (US); Aayush Gupta, San Jose, CA (US); James L. Hafner, Pacific Grove, CA (US); Maohua Lu, San Jose, CA (US); Nimrod Megiddo, Palo Alto, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 606 days.

(21) Appl. No.: 14/591,140

(22) Filed: Jan. 7, 2015

(65) Prior Publication Data

US 2016/0197986 A1 Jul. 7, 2016

(51) Int. Cl.
*G06F 9/455* (2018.01)
*H04L 29/08* (2006.01)

(52) U.S. Cl.
CPC ........ *G06F 9/45558* (2013.01); *H04L 67/148* (2013.01); *H04L 67/2861* (2013.01); *G06F 2009/45583* (2013.01)

(58) Field of Classification Search
CPC ....... G06F 9/45558; G06F 2009/45583; G06F 9/455; H04L 67/148; H04L 67/2861; H04L 29/08
See application file for complete search history.

(56) References Cited

U.S. PATENT DOCUMENTS

| | | | | |
|---|---|---|---|---|
| 7,383,405 | B2* | 6/2008 | Vega | G06F 9/4856 711/162 |
| 7,484,208 | B1* | 1/2009 | Nelson | G06F 9/45558 711/6 |
| 7,900,005 | B2* | 3/2011 | Kotsovinos | G06F 9/5083 711/162 |

(Continued)

OTHER PUBLICATIONS

U.S. Appl. No. 14/176,202, Non Final Office Action; filed Feb. 10, 2014; dated Oct. 7, 2015; 13 pages.

(Continued)

*Primary Examiner* — Krista M Zele
*Assistant Examiner* — Timothy Sowa
(74) *Attorney, Agent, or Firm* — Cantor Colburn LLP; Randall Bluestone (57) ABSTRACT

Embodiments relate to host-side cache migration. An aspect is a method that includes determining pre-fetch hints associated with a source cache that is local to a source host machine. The source cache includes pages of cache data for a virtual machine. The pre-fetch hints are sent to a pre-fetch planner to create a pre-fetch plan. The pre-fetch hints are sent based on migration of the virtual machine to a target host machine including a target cache that is local. At the source host machine, a cache migration request is received based on the pre-fetch plan. A first subset of the pages is sent from the source cache through a host-to-host communication channel to the target cache based on the cache migration request. A second subset of the pages is sent from the source cache through a host-storage communication channel to a shared storage to be relayed to the target cache.

18 Claims, 6 Drawing Sheets

(56) References Cited

U.S. PATENT DOCUMENTS

| | | | |
|---|---|---|---|
| 8,260,904 B2* | 9/2012 | Nelson | G06F 9/45558 709/220 |
| 2004/0162950 A1 | 8/2004 | Coulson | |
| 2005/0065907 A1* | 3/2005 | Chandrasekaran | G06F 11/1471 |
| 2008/0104590 A1* | 5/2008 | McCrory | G06F 9/45558 718/1 |
| 2009/0150890 A1* | 6/2009 | Yourst | G06F 8/445 718/102 |
| 2010/0169537 A1* | 7/2010 | Nelson | G06F 9/45558 711/6 |
| 2011/0131568 A1* | 6/2011 | Heim | G06F 9/4856 718/1 |
| 2011/0320415 A1* | 12/2011 | Berger | G06F 17/3048 707/692 |
| 2011/0320556 A1* | 12/2011 | Reuther | G06F 9/4856 709/213 |
| 2013/0014102 A1* | 1/2013 | Shah | G06F 9/45558 718/1 |
| 2013/0198459 A1* | 8/2013 | Joshi | G06F 12/084 711/130 |
| 2014/0012940 A1* | 1/2014 | Joshi | G06F 9/45558 709/214 |
| 2014/0108854 A1* | 4/2014 | Antony | G06F 11/203 714/4.2 |
| 2014/0215459 A1* | 7/2014 | Tsirkin | G06F 9/45558 718/1 |
| 2014/0282522 A1* | 9/2014 | Daly | G06F 9/45558 718/1 |
| 2014/0289354 A1* | 9/2014 | Green | G06F 3/0617 709/212 |
| 2014/0297780 A1* | 10/2014 | Zhou | H04L 67/2847 709/216 |
| 2015/0012712 A1* | 1/2015 | Penner | G06F 12/0862 711/137 |
| 2016/0127495 A1* | 5/2016 | Tasoulas | H04L 67/1097 709/223 |

OTHER PUBLICATIONS

B. Nicolae, et al., A Hybrid Local Storage Transfer Scheme for Live Migration of I/O Intensive Workloads, Proceedings of the 21st International Symposium on High-Performance Parallel and Distributed Computing, pp. 85-96 ACM, Jun. 2012.

C. Jo, et al., Efficient Live Migration of Virtual Machines Using Shared Storage, Proceedings of the 9th ACM SIGPLAN/SIGOPS International Conference on Virtual execution Environments, pp. 41-50, ACM, Mar. 2013.

L. Hu, et al., HMDC: Live Virtual Machine Migration Based on Hybrid Memory Copy and Delta Compression, Applied Mathematics & Information Sciences 7, No. 2L, pp. 639-646, Jan. 2013.

List of IBM Patents or Patent Applications Treated as Related; Jan. 7, 2012, 2 pages.

S. Akiyama, et al., Fast Wide Area Live Migration with a Low Overhead through Page Cache Teleportation, 2013 13th IEEE/ACM International Symposium on Cluster, Cloud and Grid Computing (CCGrid), pp. 78-82, IEEE, May 2013.

S. Sahani, et al., A Hybrid Approach to Live Migration of Virtual Machines, 2012 IEEE International Conference on Cloud Computing in Emerging Markets (CCEM), 6 pages, IEEE, Oct. 2012.

U.S. Appl. No. 14/176,202, filed Feb. 10, 2014, Entitled: Migrating Local Cache State With a Virtual Machine, First Named Inventor: Aayush Gupta.

* cited by examiner

HOST-SIDE CACHE MIGRATION

BACKGROUND

Embodiments of the invention relate generally to virtual machine (VM) migration and, more specifically, to a host-side cache migration to support VM migration.

Modern processor architectures have enabled virtualization techniques that allow multiple operating systems and VMs to run on a single physical machine. These techniques often use a hypervisor layer that runs directly on the physical hardware and mediates accesses to physical hardware by providing a virtual hardware layer to the operating systems running in each virtual machine. The hypervisor can operate on the physical machine in conjunction with a "native VM." Alternatively, the hypervisor can operate within an operating system running on the physical machine, in conjunction with a 'hosted VM' operating at a higher software level.

A VM may be migrated from one physical machine (e.g., from a "source host processor") to another physical machine (e.g., to a "target host processor") for a variety of reasons, such as resource constraints on the source host processor or maintenance of the source host processor. In environments where host-side caching is used, VM migration often results in an initial degradation of performance due to the local cache on the target host processor not having any entries associated with the migrated VM when the VM is restarted on the target host processor.

SUMMARY

Embodiments include methods and systems for host-side cache migration. One method includes determining a plurality of pre-fetch hints associated with a source cache that is local to a source host machine. The source cache includes a plurality of pages of cache data for a virtual machine on the source host machine. The pre-fetch hints are sent to a pre-fetch planner to create a pre-fetch plan. The pre-fetch hints are sent based on a migration of the virtual machine from the source host machine to a target host machine including a target cache that is local to the target host machine. At the source host machine, a cache migration request is received based on the pre-fetch plan. A first subset of the pages is sent from the source cache through a host-to-host communication channel to the target cache of the target host machine based on the cache migration request. A second subset of the pages is sent from the source cache through a host-storage communication channel to a shared storage to be relayed to the target cache of the target host machine.

Another method includes accessing a pre-fetch plan that is based on a plurality of pre-fetch hints associated with a source cache and a predetermined virtual machine migration time budget to migrate a virtual machine from a source host machine to a target host machine. The source cache includes a plurality of pages of cache data for the virtual machine on the source host machine. A first subset and a second subset of the pages are identified to transfer from the source cache to a target cache based on the pre-fetch plan. The source cache is local to the source host machine, and the target cache is local to the target host machine. A cache migration request is sent to the source host machine based on the pre-fetch plan. The first subset of the pages is pre-fetched from the source cache through a host-to-host communication channel based on the pre-fetch plan. The second subset of the pages is pre-fetched from a shared storage through a host-storage communication channel as relayed from the source cache in response to the cache migration request.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to reducing cache misses when a virtual machine (VM) restarts on a new host machine. Embodiments include migrating locally cached data associated with a VM as part of migrating the VM from a source host processor on a source host machine (also referred to as a source compute node) to a target host processor on a target host machine (also referred to as a target compute node). In exemplary embodiments, populating of a target cache (e.g., a local cache that is accessible by the target host processor) with cache data associated with the VM is expedited by providing pre-fetch hints to a pre-fetch planner to create a pre-fetch plan prior to the completion of the migration of the VM to the target host machine. A migration management application on the target host processor utilizes the pre-fetch plan based on the pre-fetch hints to pre-fetch data and warm-up the target cache with at least a portion of VM-related data from a source cache, thus reducing the number of cache misses by the VM once it restarts on the target host processor. As used herein, the term "pre-fetch hint" refers to one example of metadata that may be used to describe a current state of a cache. Other examples include, but are not limited to: transfer of actual cached data from source to target, and transfer of a list of operations being performed at the source so that the target can apply those operations to pre-fetch the data from shared storage. The source cache and target cache are referred to as host-side caches that provide VMs local access to cached data from a remote data source such as the shared storage.

In embodiments described herein, a cache migration application may detect that a VM migration process to move a VM from a source host machine to another physical machine has reached a stage where the VM has been paused at the source host machine. The pausing indicates that that the VM migration is nearing completion. A state of a local cache associated with the VM is then identified and pre-fetch hints that are based on the state of the local cache are sent to a pre-fetch planner to create a pre-fetch plan for the target host machine where the VM is being moved. The target host machine may then use the pre-fetch plan to pre-fetch data associated with the migrating VM into a cache that is local to the target host machine. In an embodiment, the pre-fetching by the target host machine is performed in the background and independently of the migration of the VM.

Pre-fetch hints may also be sent to the pre-fetch planner when the cache migration application detects that the migration of the VM has started. In addition, recurring intermediate pre-fetch hints may also be sent to the pre-fetch planner in between the initial round of pre-fetch hints that are sent based on detecting that the migration has started and the final round of pre-fetch hints that are sent based on detecting that the migration is nearing completion.

Contemporary approaches to avoiding cache re-warming overhead when a VM is migrated to a new host machine include targeted synchronous mirroring of cache resources, shared solid state device (SSD) cache between servers, and keeping the cache location static. Advantages of embodiments described herein when compared to contemporary approaches may include flexibility, low overhead, efficiency, and support for migration of both write-through and write-back caches. For example, unlike synchronous mirroring, embodiments are flexible in that there is no need to pre-decide on a target host. In addition, unlike synchronous mirroring and shared SSD caches, low overhead is achieved by embodiments described herein due to not requiring additional processing to be performed during the non-migration (e.g., normal operation) phases. Still further, embodiments described herein are more efficient when compared to static caches due to not requiring extra network hops to reach the cache after the VM migration is complete.

Embodiments use the pre-fetch hints and a predetermined VM migration time budget to generate a pre-fetch plan for pre-fetching a subset of pages from a source cache and a subset of pages from shared storage. An optimization metric can be selected, such as how frequently one of the pages in the source cache is accessed, which may also be referred to as "heat" or utility level. As another example, the optimization metric can be an indication of most recently accessed pages. The optimization metric may be included with one or more other metrics about the source cache in the pre-fetch hints. A pre-fetch plan can be generated based on the optimization metric to focus pre-fetching activity within the predetermined VM migration time budget. The pre-fetch plan can be generated by a pre-fetch planner executing on the source host machine, the target host machine, or other entity (e.g., a planner node, cluster manager, etc.), where the pre-fetch plan is accessed by the target host machine. Pre-fetching a subset of pages can include one or more of: pre-fetching from the source cache as random input/output (I/O) requests, pre-fetching from the source cache as batched random I/O requests, pre-fetching from the source cache via batched requests from the source cache through a sequential log on shared storage, and pre-fetching from shared storage as large sequential I/O requests. In cases where the source cache is used as a write-back cache, the pre-fetch plan can include fetches of all dirty blocks (e.g., blocks with a more recent version in the source cache than on shared storage) from source cache. The source cache may write-back all dirty blocks to shared storage and then send the pre-fetch hints. Additionally, the source cache can be transformed from write-back to write-through mode during VM migration.

Figure 1:
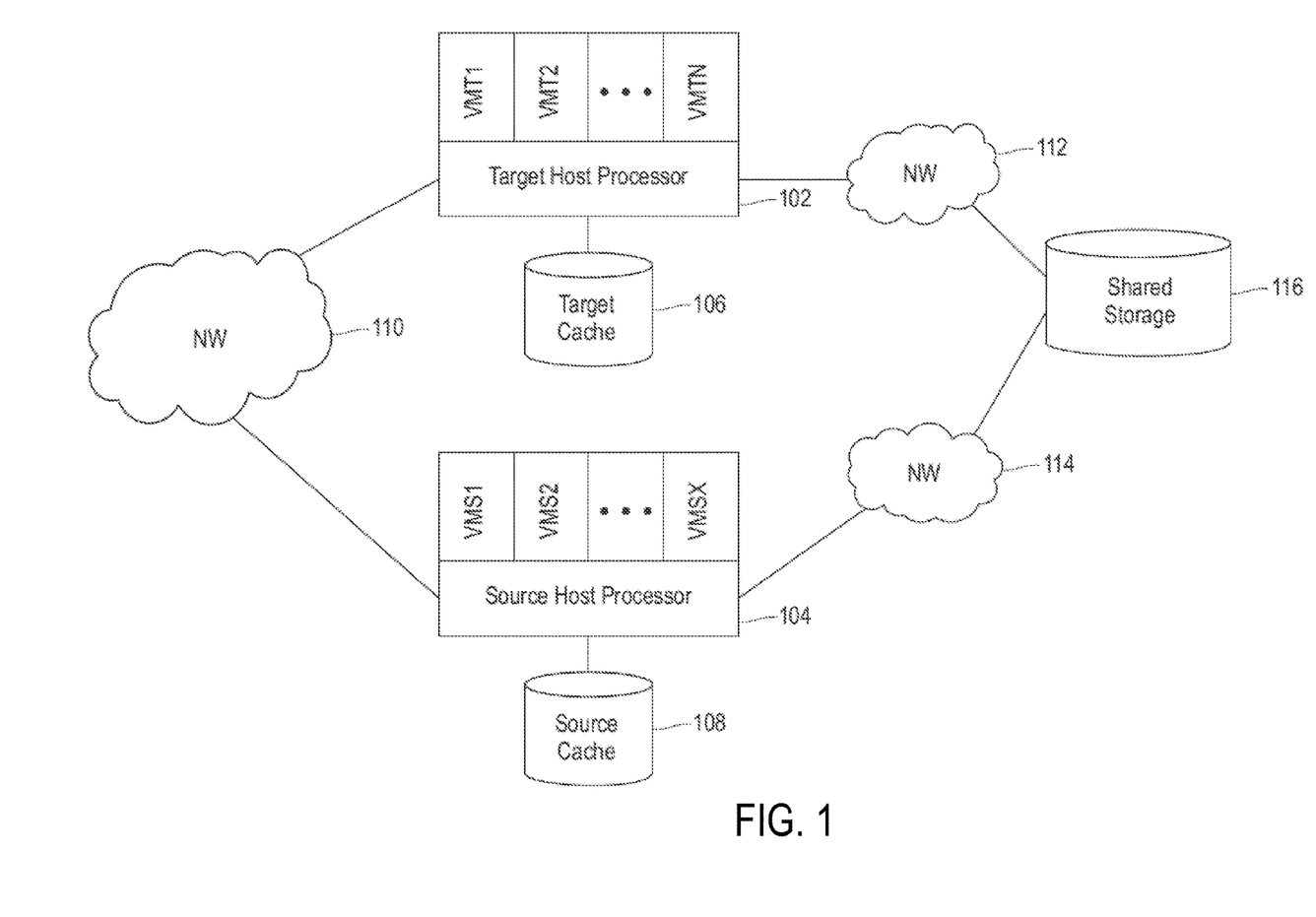
FIG. 1 depicts a system environment for practicing the teachings herein in accordance with an embodiment.

Referring now to FIG. 1, a system environment for practicing the teachings herein in accordance with embodiments is generally shown. As shown in FIG. 1, a target host processor 102 and a source host processor 104 are in communication via a network 110. The network 110 may be any type of network known in the art suitable for migrating VMs between the target host processor 102 and the source host processor 104, such as Ethernet, fiber channel and/or InfiniBand. The network 110 is also referred to as a host-to-host network that links at least two physically separate host machines in which the target host processor 102 and the source host processor 104 respectively reside.

As shown in FIG. 1, the target host processor 102 is executing "N" VMs (e.g., VMT1, VMT2, . . . , VMTN) and is directly connected (e.g., via a cable, via a wireless connection) to a local cache device, shown in FIG. 1 as target cache 106. The target cache 106 may be implemented by one or more SSDs to provide host-side caches for the VMs executing on the target host processor 102. In an embodiment, the target cache 106 is accessible by the target host processor 102 and not accessible by the source host processor 104. In this embodiment, all accesses to contents of the target cache 106 are via the target host processor 102. The target host processor 102 is also in communication with a shared storage 116 via a network 112. The network 112 may be implemented by any network suitable for data transfer such as a storage area network (SAN) or network attached storage (NAS). In an embodiment, the shared storage 116 is accessed by the target host processor 102 via the network 112 as a SAN or NAS. All or a portion of the cache data stored in the target cache 106 may be sourced from the shared storage 116.

The source host processor 104 shown in FIG. 1 is executing "X" VMs (e.g., VMS1, VMS2, . . . , VMSX) and is directly connected (e.g., via a cable, via a wireless connection) to a local cache device, shown in FIG. 1 as source cache 108. In another embodiment, the source cache 108 is located on the source host processor 104. The source cache 108 may be implemented by one or more SSDs to provide host-side caches for the VMs executing on the source host processor 104. In an embodiment, the source cache 108 is accessible by the source host processor 104 and not accessible by the target host processor 102. In this embodiment, all accesses to contents of the source cache 108 are via the source host processor 104. The source host processor 104 is also in communication with the shared storage 116 via a network 114. The network 114 may be implemented by any network suitable for data transfer such as a SAN or NAS. In an embodiment, the shared storage 116 is accessed by the source host processor 104 via the network 114 as a SAN or NAS. All or a portion of the cache data stored in the source cache 108 may be sourced from the shared storage 116.

The shared storage 116 may be implemented by any storage devices known in the art, such as but not limited to direct access storage devices (DASDs), e.g., hard disk drives (HDDs), solid state drives (SSDs), storage controllers, or tape systems. In an embodiment, the shared storage 116 does not maintain metadata about blocks being accessed by the different VMs. In an embodiment, network 112 and network 114 are implemented as a single network. The network 112 and network 114 may be referred to collectively or separately as storage area networks or host-storage networks.

Though only two host machines (containing, for example a processor and a cache) are shown in FIG. 1, more than two host machines may be implemented and capable of accessing the shared storage 116. In addition, a target host processor for a VM migration may be selected from two or more candidate host machines based on factors such as capacity, processor speed, and migration cost as is known in the art.

Figure 2:
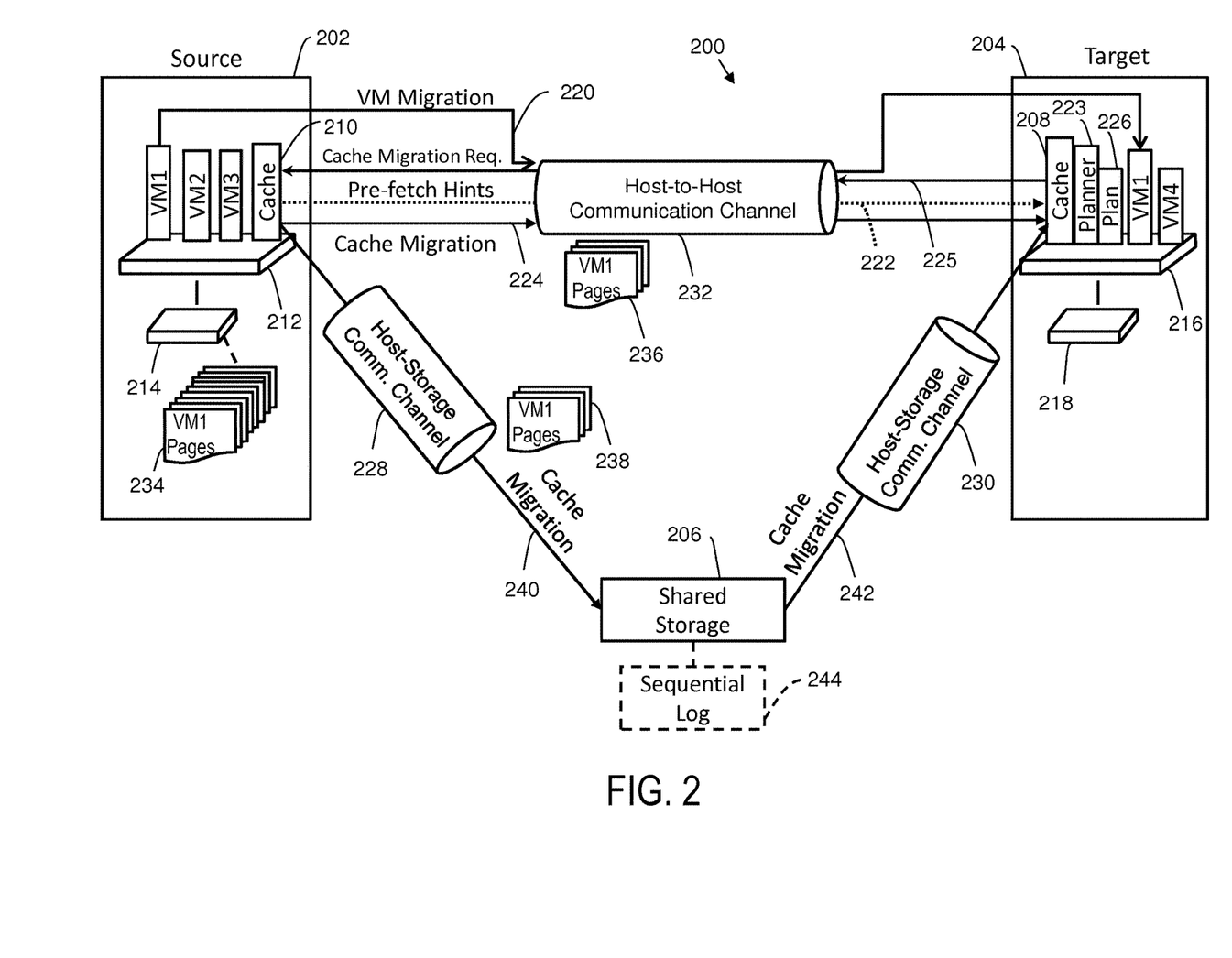
FIG. 2 depicts a dataflow for host-side cache migration to support a virtual machine (VM) migration in accordance with an embodiment.

Referring now to FIG. 2, a dataflow 200 for local cache migration along with a VM migration in accordance with an embodiment is generally shown. FIG. 2 depicts a source host machine 202, a target host machine 204, and a shared storage 206. The source host machine 202 includes a source host processor 212 and a source cache 214 as embodiments of the source host processor 104 and source cache 108 of FIG. 1. The source host machine 202 executes VM1 (which in the example described herein will be migrated to target host machine 204), VM2, VM3 and a source cache migration application 210. In addition, the source host machine 202 is in communication with the shared storage 206 for accessing shared data via a host-storage communication channel 228. The shared storage 206 is an embodiment of the shared storage 116 of FIG. 1, and the host-storage communication channel 228 is a communication channel of network 114 of FIG. 1. The source cache migration application 210 may execute as part of a hypervisor executing on the source host machine 202. Alternatively, the source cache migration application 210 may execute as part of a VM executing on the source host machine 202.

The target host machine 204 shown in FIG. 2 includes a target host processor 216 and a target cache 218, as embodiments of the target host processor 102 and target cache 106 of FIG. 1. In the example described herein, the target host machine 204 will execute VM1 (once it is migrated from the source host machine 202), VM4, and a target cache migration application 208. In addition, the target host machine 204 is in communication with the shared storage 206 for accessing shared data via a host-storage communication channel 230, where the host-storage communication channel 230 is a communication channel of network 112 of FIG. 1. The target cache migration application 208 may execute as part of a hypervisor executing on the target host machine 204. Alternatively, the target cache migration application 208 may execute as part of a VM executing on the target host machine 204.

Pre-fetch hints 222 associated with cache migration of the source cache 214 to the target cache 218 can be sent as metadata to a pre-fetch planner 223 supporting the migration of VM1 from the source host machine 202 to the target host machine 204 via a host-to-host communication channel 232. Although the pre-fetch planner 223 is depicted in FIG. 2 as executing on the target host machine 204, in alternate embodiments, the pre-fetch planner 223 can execute on the source host machine 202 or on another entity (not depicted). The host-to-host communication channel 232 may be a communication channel of network 110 of FIG. 1. The pre-fetch planner 223 can use the pre-fetch hints 222 to form a pre-fetch plan 226. In an embodiment, the cache migration 224 begins execution after the VM migration 220 begins and the cache migration 224 ends prior to the VM migration 220 completing. This timing may be achieved by starting the cache migration 224 based on detecting that the VM migration 220 has started execution, and by completing the cache migration 224 based on detecting that the VM migration 220 has reached a stage where the VM has been paused on the source host machine 202 or upon completing execution of the pre-fetch plan 226. The pre-fetch plan 226 may be constrained by a predetermined virtual machine migration time budget to limit a maximum VM migration time between the source host machine 202 and the target host machine 204.

Though shown as two separate computer applications, the source cache migration application 210 and the target cache migration application 208 may be combined into a single cache migration application with particular functions being performed, or code segments executed, based on whether the host machine where the application is executing is a target or a source host machine for a VM migration. In an embodiment, one or both of the source cache migration application 210 and the target cache migration application 208 may be combined with computer-readable instructions for managing cache accesses during normal system operation of the VM. The pre-fetch planner 223 may be combined with the source cache migration application 210 and/or the target cache migration application 208.

In an embodiment, the source cache migration application 210 receives a notification, or otherwise detects, that a migration of a VM from the source host machine 202 to the target host machine 204 has begun. For example, a source hypervisor may notify the source cache migration application 210. Another way is for a target hypervisor to inform the target cache migration application 208 that a new VM is migrating from the source host machine 202 as VM migration 220. Based on this, the target cache migration application 208 may request the source cache migration application 210 to send pre-fetch hints 222 to the pre-fetch planner 223. Based on receiving the notification, the source cache migration application 210 sends metadata regarding the pre-fetch hints 222 about a plurality of pages 234 of cache data for a VM (e.g., VM1) in the source cache 214 (e.g., page number, size, access frequency, corresponding location in shared storage 206, etc.) to the pre-fetch planner 223 to create the pre-fetch plan 226 for the target cache migration application 208 executing on the target host machine 204. The target cache migration application 208 accesses the pre-fetch plan 226 to transfer a first subset 236 and a second subset 238 of the pages 234 from the source cache 214 to the target cache 218 based on the pre-fetch hints 222 and a predetermined virtual machine migration time budget to migrate the VM. The target host machine 204 can send a cache migration request 225 to the source host machine 202 based on the pre-fetch plan 226.

The target host machine 204 can pre-fetch the first subset 236 of the pages 234 from the source cache 214 through the host-to-host communication channel 232 based on the pre-fetch plan 226. The target host machine 204 can also pre-fetch the second subset 238 of the pages 234 from the shared storage 206 through the host-storage communication channel 230 as relayed from the source cache 214 in response to the cache migration request 225. The host-to-host communication channel 232 may have a lower communication bandwidth than the host-storage communication channels 228 and 230. In an embodiment, the source cache 214 has similar I/O access timing for random data block access as sequential data block access, where random data block access is an arbitrary (e.g., non-sequential) access pattern sequence. In contrast, the shared storage 206 may have a substantially faster access time for sequential data block accesses than random data block accesses. As used herein, the term "data block" refers to a group of bits that are retrieved and written to as a unit.

To take advantage of multiple communication paths, cache migration 224 can be performed for the first subset 236 of the pages 234 in parallel with cache migration 240 and cache migration 242 for the second subset 238 of the pages 234. The first subset 236 of pages 234 can be sent primarily as random I/O, i.e., randomly accessed data blocks. The cache migration 242 from the shared storage 206 to the target host machine 204 can be sent primarily as sequential I/O, i.e., sequentially accessed data blocks. For example, the pre-fetch hints 222 may identify sequential data blocks that can be sequentially accessed directly from the shared storage 206. Where a sufficiently large amount of random data blocks are to be migrated, the source cache migration application 210 can include in cache migration 240 a number of random data blocks (i.e., data blocks originating from non-sequential locations in source cache 214) formatted as a sequential log 244 to be temporarily stored in the shared storage 206. Thus, the pre-fetching performed by the target host machine 204 can include pre-fetching at least two random data blocks of the second subset 238 of the pages 234 from the sequential log 244 on the shared storage 206 as sequential data. Additionally, the cache migration 224 can include some amount of sequential data blocks, and the cache migration 242 can include some amount of random data blocks. The first subset 236 of the pages 234 may be allocated in the pre-fetch plan 226 with a lesser amount of sequential data blocks and a greater amount of random data blocks. Likewise, the second subset 238 of the pages 234 can be allocated in the pre-fetch plan 226 with a greater amount of sequential data blocks and a lesser amount of random data blocks.

In one embodiment, a linear-programming solver is implemented by the pre-fetch planner 223 to establish segments between random sets and sequential sets of cache pages, as the random data blocks and sequential data blocks. Table 1 defines a number of terms used by a linear programming model. The pre-fetch planner 223 can cluster pages in segments with a number of constraints, find a fraction of sequential and random sets that should be pre-fetched from shared storage 206 and source cache 214 within a predetermined virtual machine migration time budget subject to constraints, and may sort selected sets chosen to be pre-fetched in an order of utility

TABLE 1

Linear Programming Model Terms

| Term | Description |
| --- | --- |
| \|H\| | Number of caching utility levels |
| $B^{NS}$ | Bandwidth of shared storage network |
| $B^{EW}$ | Bandwidth of host-to-host network |
| $IOPS_R^{cache}$ | 4 KB Random IOPS from cache |
| $IOPS_R^{SS}$ | 4 KB Random IOPS from shared storage |
| $IOPS_{S_k}^{SS}$ | 4 KB Sequential IOPS from shared storage for requests of size k pages |
| T | Original VW migration time |
| δ | Additional acceptable VM migration time |
| $T_{seq}$ | Number of pages to qualify as a sequential segment |
| $seq_j$ | Actual number of cached pages in a sequential segment |
| $D_{S_i}$ | Sum of the length of $seq_j$ with similar utility (includes non cached pages in the segment) |
| $D_{R_i}$ | Number of random pages with similar utility |
| $\mu_i$ | Average size (4 KB pages) of a segment in sequential set i |
| $U_{S_i}$ | Validity density of the segments forming sequential set i |
| $H_{S_i}$ | Utility of sequential set i |
| $H_{R_i}$ | Utility of random set i |
| $f_{S_i}^{NS}$ | Fraction of sequential set i pre-fetched from shared storage |
| $f_{S_i}^{EW}$ | Fraction of sequential set i pre-fetched from host-side cache |
| $f_{R_i}^{NS}$ | Fraction of random set i pre-fetched from shared storage |
| $f_{R_i}^{EW}$ | Fraction of random set i pre-fetched from host-side cache |

A linear programming model can be computed with respect to the linear programming model terms of table 1 according to the follow sequence of inequalities (1)-(10) in an embodiment.

Maximize $$\sum_{i \in |H|} (H_{R_i} \times [(f_{R_i}^{NS} + f_{R_i}^{EW}) \cdot D_{R_i}] + H_{S_i} \times [(f_{S_i}^{NS} + f_{S_i}^{EW}) \cdot D_{S_i}])$$

Subject to $$\sum_{i \in |H|} (f_{R_i}^{NS} \cdot D_{R_i} + f_{S_i}^{NS} \cdot D_{S_i}) \le \frac{B^{NS}}{4KB} \times (T + \delta) \quad (1)$$

$$\sum_{i \in |H|} (f_{R_i}^{EW} \cdot D_{R_i} + f_{S_i}^{EW} \cdot (D_{S_i} U_{S_i})) \le \frac{B^{EW}}{4KB} \times \delta \quad (2)$$

$$\sum_{i \in |H|} \left( \frac{(f_{R_i}^{NS} \cdot D_{R_i})}{IOPS_R^{SS}} + \frac{(f_{S_i}^{NS} \cdot D_{S_i})}{IOPS_{S_{\mu_i}}^{SS}} \right) \le (T + \delta) \quad (3)$$

$$\sum_{i \in |H|} \left( \frac{(f_{R_i}^{EW} \cdot D_{R_i})}{IOPS_R^{cache}} + \frac{(f_{S_i}^{EW} \cdot (D_{S_i} U_{S_i}))}{IOPS_R^{cache}} \right) \le \delta \quad (4)$$

$$(f_{R_i}^{NS} \cdot f_{R_i}^{EW}) \le 1 \forall i \in |H| \quad (5)$$

$$(f_{S_i}^{NS} \cdot f_{S_i}^{EW}) \le 1 \forall i \in |H| \quad (6)$$

$$0 \le f_{R_i}^{NS} \le 1 \forall i \in |H| \quad (7)$$

$$0 \le f_{R_i}^{EW} \le 1 \forall i \in |H| \quad (8)$$

$$0 \le f_{S_i}^{NS} \le 1 \forall i \in |H| \quad (9)$$

$$0 \le f_{S_i}^{EW} \le 1 \forall i \in |H| \quad (10)$$

Constraints for clustering of pages into segments can include that a variation of utility (heat) of the pages in the cluster should be less than a threshold ($T_{HVAR}$). Pages in a segment may be constrained within a predefined distance of each other, and the clusters should not overlap. Clusters with a size less than $T_{seq}$ can be treated as random sets and remaining clusters can be treated as sequential sets. All random pages with the same utility (i.e., within δ of each other) can be collected into a random set, where the number of random sets equals the number of utility levels. Similarly, all sequential subsets with the same utility (i.e., within δ of each other) can be collected into a sequential set, where the number of sequential sets equals the number of utility levels. A fraction of each sequential and random set which should be pre-fetched from shared storage and the source cache within the time budget can be determined such that overall utility pre-fetched in the target cache is maximized subject to inequalities (1)-(10). The fraction determination may also verify that available bandwidth constraints of the host-storage communication channels 228 and 230 and host-to-host communication channel 232 are observed. Further constraints can include ensuring that the shared storage 206 and source cache 214 are able to service the pre-fetch plan 226 within the available time budget. Ordering may be performed to sort all of the random sets along with the sequential sets chosen to be pre-fetched from via the host-to-host communication channel 232 in the utility order of individual pages.

An alternate embodiment employs a "greedy" solver in the pre-fetch planner 223 to determine the pre-fetch plan

226. A chunk size, such as one megabyte, may be selected and the threshold $T_{seq}$ can be set to a value of less than or equal to 256 pages, using 4 kilobyte (KB) pages in this example. A list of hints that identify pages may be divided into sequential and random sets. A page is sequential if more than $T_{seq}$ pages in the list of hints belong to an enclosing chunk; otherwise, the page belongs to a random set. Random pages can be further subdivided into subsets of similar utility (within δ of each other), where the number of random subsets equals the number of utility levels (i.e., utility range/δ). The sequential pages can be further subdivided into neighbor subsets. The utility of a sequential neighbor subset can be defined as a function of the utility of the pages within the subset (e.g., average)—utility may be additive. The sequential neighbor subsets can be collected into sequential chunk sets with similar utility (within δ of each other), where the number of sequential chunk sets equals the number of utility levels. A fraction of each random subset that can be transferred from the source cache in the allotted time budget and that maximizes the utility of the random pages in the target cache can be determined. Additionally, a fraction of each sequential chunk set that can be transferred from the shared storage using sequential data blocks in the allotted time budget and that maximizes the utility of the sequential pages in the target cache 218 can also be determined by the pre-fetch planner 223.

Iterations over a range of values of $T_{seq}$ may be performed to find a threshold that maximizes the total utility in the target cache 218. For a given $T_{seq}$, if there is available time budget on the "random page" path (i.e., from the source host machine 202 to the target host machine 204) after sending all the random pages (i.e., random data blocks), and not all chunks can be sent from the shared storage 206; remaining sequential pages (i.e., sequential data blocks) can be reprocessed as random (e.g., T=256) and maximize utility in the remaining time budget. Similarly, if there is available budget on the "sequential" path (i.e., from shared storage 206), the remaining random pages can be reprocessed as sequential (T=0) and the utility can be maximized in the remaining time budget. A formulation can be performed as a linear optimization that further allows for sequential pages to be sent from source cache 214 and random pages to be chunked and sent from shared storage 206, while optimizing the total utility at the target cache 218. By clustering, optimum partitioning of the pages in the list of hints into random and sequential (with varying chunk size) can be determined to maximize the total utility at the target cache 218 while staying within the allotted time budget, sending random pages from the source cache 214, sequential chunks from the shared storage 206.

Figure 3:
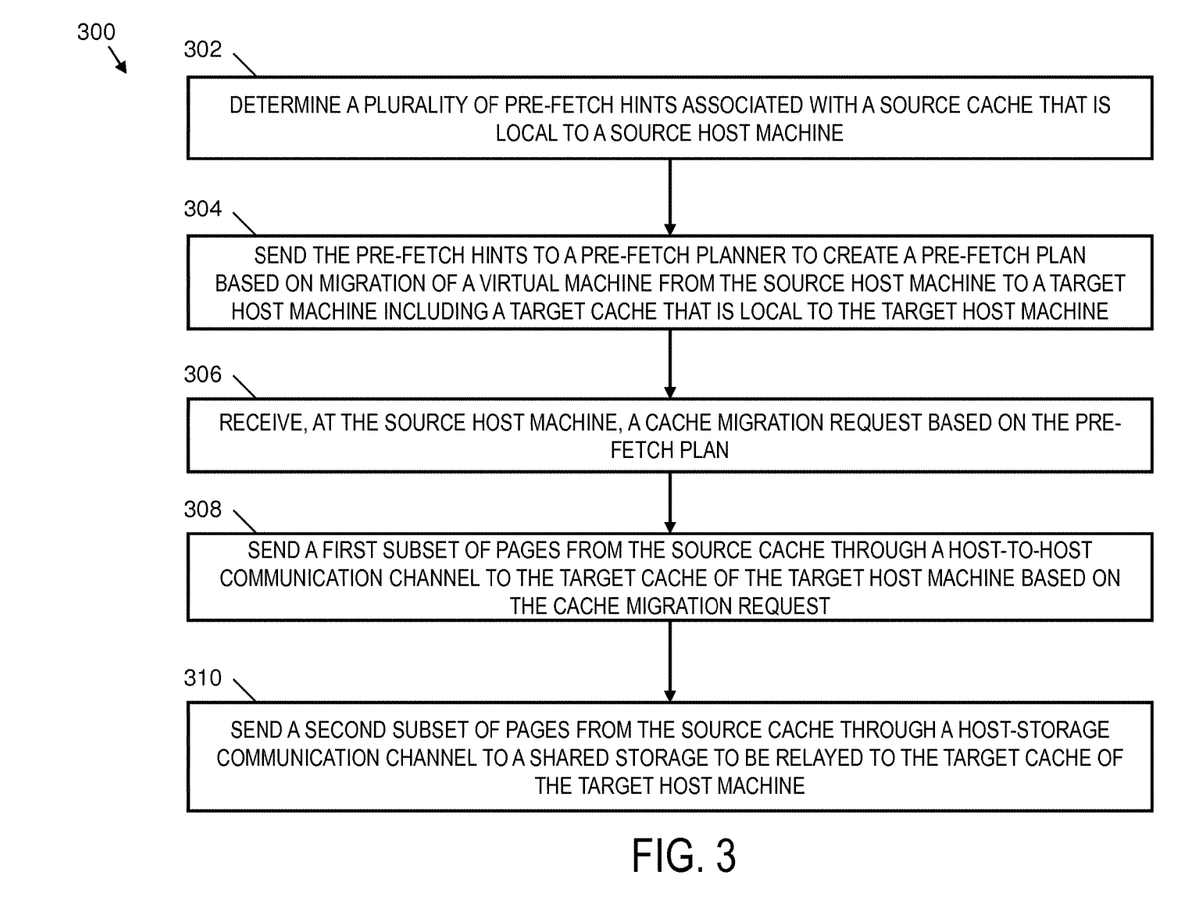
FIG. 3 depicts a process on a source host processor for cache migration to a target host processor in accordance with an embodiment.

FIG. 3 depicts a process 300 on a source host processor for cache migration to a target host processor in accordance with an embodiment. The process 300 can be performed by the source host processor 212 of the source host machine 202 of FIG. 2 and is further described in reference to FIG. 2 for purposes of explanation. However, the process 300 of FIG. 3 can be implemented on systems with alternate configurations and elements beyond those depicted in the example of FIG. 2.

At block 302, the source host processor 212 can determine a plurality of pre-fetch hints 222 associated with source cache 214, where the source cache 214 is local to source host machine 202. The source cache 214 may include a plurality of pages 234 of cache data for a virtual machine (such as VM1) on the source host machine 202. The pages 234 can include local copies of data sets from shared storage 206. The pre-fetch hints 222 can include a priority order to indicate a suggested pre-fetching order. For example, the pre-fetch hints 222 can include metadata such as page number, size, access frequency, and corresponding location in shared storage 206 to assist in prioritizing pre-fetching subsets of the pages 234.

At block 304, the source host machine 202 can send the pre-fetch hints 222 to pre-fetch planner 223 to create pre-fetch plan 226 based on migration of the virtual machine from the source host machine 202 to target host machine 204, which includes a target cache 218 that is local to the target host machine 204. The target host machine 204 cannot directly access the source cache 214, and thus requests migration of cache data from the source host machine 202. Sending of the pre-fetch hints 222 can be based on a migration of the virtual machine (e.g., VM migration 220) from the source host machine 202 to the target host machine 204. The process of initiating the VM migration 220 can trigger the determination and sending of the pre-fetch hints 222. The source host machine 202 may also identify dirty blocks in the source cache 214 as one or more data blocks with a more recent version in the source cache 214 than on the shared storage 206. The source host machine 202 may initiate writing of the dirty blocks back to the shared storage 206 prior to sending the pre-fetch hints 222 to the pre-fetch planner 223.

At block 306, the source host machine 202 receives a cache migration request 225 based on the pre-fetch plan 226. A cache migration request 225 can indicate how to partition migration of selected data from the pages 234 into subsets as cache migration 224 and 240.

At block 308, the source host machine 202 sends a first subset 236 of the pages 234 from the source cache 214 through host-to-host communication channel 232 to the target cache 218 of the target host machine 204 based on the cache migration request 225. At block 310, the source host machine 202 sends a second subset 238 of the pages 234 from the source cache 214 through a host-storage communication channel 228 to shared storage 206 to be relayed to the target cache 218 of the target host machine 204.

Figure 4:
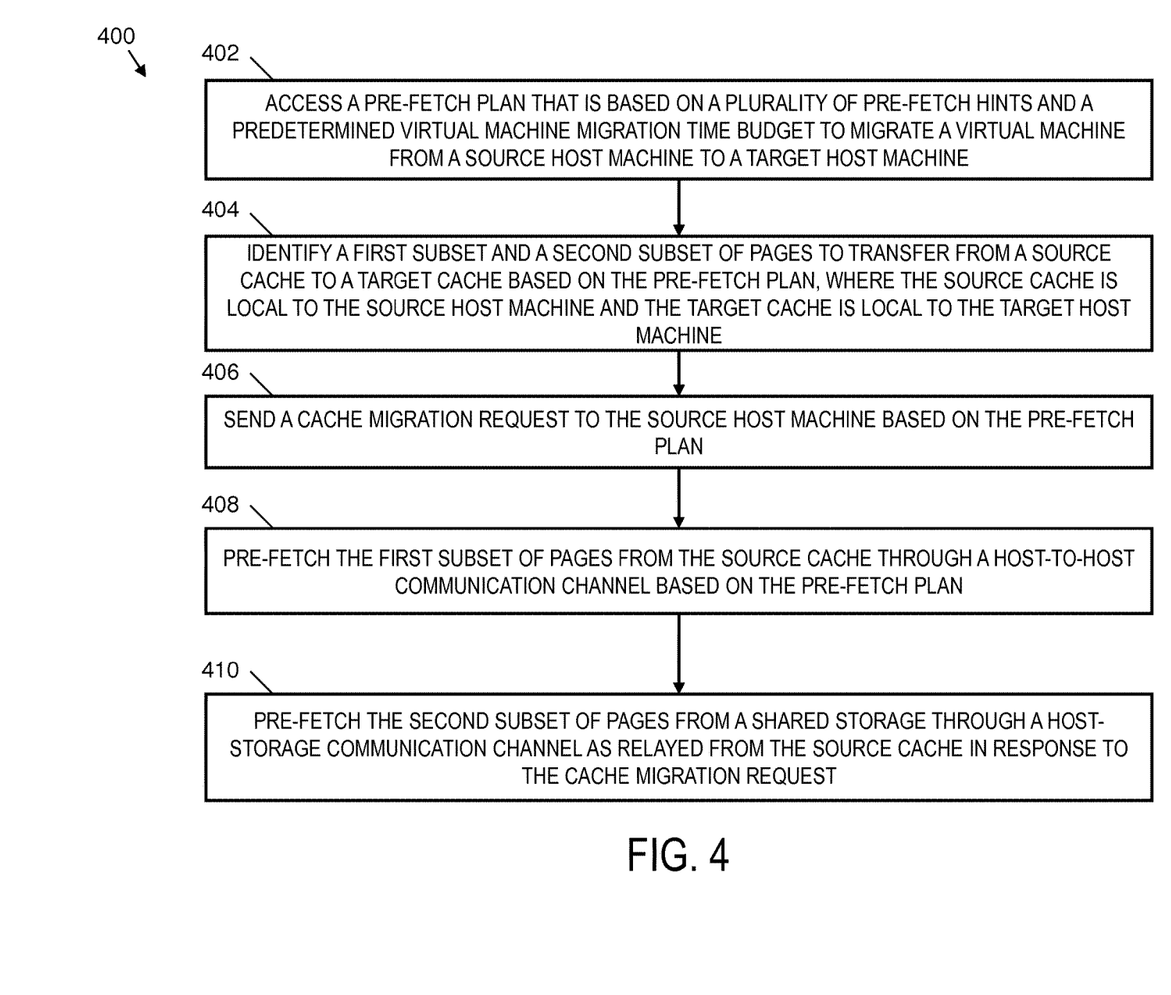
FIG. 4 depicts a process on a target host processor for cache migration from a source host processor in accordance with an embodiment.

FIG. 4 depicts a process 400 on a target host processor for cache migration from a source host processor in accordance with an embodiment. The process 400 can be performed by the target host processor 216 of the target host machine 204 of FIG. 2 and is further described in reference to FIG. 2 for purposes of explanation. However, the process 400 of FIG. 4 can be implemented on systems with alternate configurations and elements beyond those depicted in the example of FIG. 2.

At block 402, the target host machine 204 accessing a pre-fetch plan 226 that is based on a plurality of pre-fetch hints 222 associated with a source cache 214 and a predetermined virtual machine migration time budget to migrate a virtual machine from a source host machine 202 to a target host machine 204. As previously described, the source cache 214 can include a plurality of pages 234 of cache data for the virtual machine (such as VM1) on the source host machine 202. The source cache 214 is local to the source host machine 202, and the target cache 218 is local to the target host machine 204. The pre-fetch plan 226 is generated by the pre-fetch planner 223, which may execute on the source host machine 202, target host machine 204, or another entity (not depicted).

At block 404, the target host processor 216 identifies a first subset 236 and a second subset 238 of the pages 234 to transfer from the source cache 214 to the target cache 218 based on the pre-fetch plan 226. As one example, when the target host processor 216 executes the pre-fetch planner 223, the target host processor 216 can determine a utility level of data blocks identified in the pre-fetch hints 222. The pre-fetch planner 223 may establish assignments in the pre-fetch plan 226 for the first subset 236 and the second subset 238 of the pages 234 associated with the data blocks based on the utility level. The pre-fetch plan 226 can also include one or more fetches from the source cache 206 of one or more data blocks with a more recent version in the source cache 214 than on the shared storage 206.

The pre-fetch planner 223 can determine a first data transfer bandwidth from the source cache 214 through host-to-host communication channel 232 to the target cache 218. The pre-fetch planner 223 may determine second data transfer bandwidth from the source cache 214 and the shared storage 206 through host-storage communication channels 228 and 230 to the target cache 218. The first subset 236 and the second subset 238 of the pages 234 may be assigned in the pre-fetch plan 226 based on a combination of the first data transfer bandwidth, the second data transfer bandwidth, one or more data size constraints, and the predetermined virtual machine migration time budget.

At block 406, the target host machine 204 can send a cache migration request 225 to the source host machine 202 based on the pre-fetch plan 226. At block 408, the target host machine 204 can pre-fetch the first subset 236 of the pages 234 from the source cache 214 through host-to-host communication channel 232 based on the pre-fetch plan 226. At block 410, the target host machine 204 can pre-fetch the second subset 238 of the pages 234 from shared storage 206 through host-storage communication channel 230 as relayed from the source cache 214 in response to the cache migration request 225. Alternatively, another entity or entities can perform the pre-fetches of blocks 408 and 410 and provide the pre-fetched data to the target host machine 204. The target host machine 204 can then write the pre-fetched data to the target cache 218.

Figure 5:
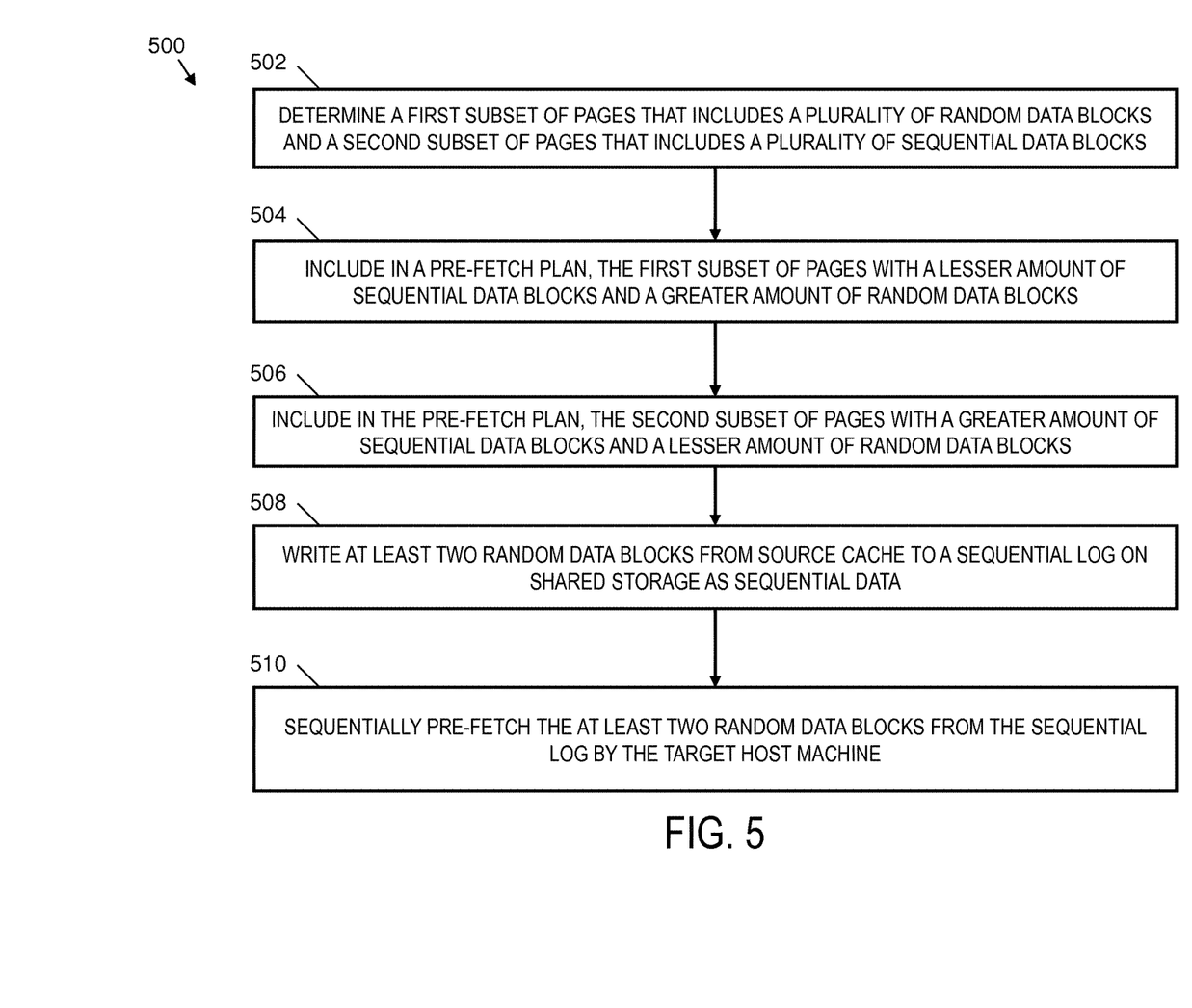
FIG. 5 depicts a process to pass random data blocks through a sequential log in a storage system between a source host processor and a target host processor in accordance with an embodiment.

FIG. 5 depicts a process 500 to pass random I/O through a sequential log in a storage system between a source host processor and a target host processor in accordance with an embodiment. The process 500 can be performed by the source host processor 212 and the target host processor 216 of FIG. 2 and is further described in reference to FIG. 2 for purposes of explanation. However, the process 500 of FIG. 5 can be implemented on systems with alternate configurations and elements beyond those depicted in the example of FIG. 2.

At block 502, the pre-fetch planner 223 can determine a first subset 236 of pages 234 that includes a plurality of random data blocks. The pre-fetch planner 223 can also determine a second subset 238 of pages 234 that includes a plurality of sequential data blocks. The first subset 236 of the pages 234 can also include sequential data blocks, and the second subset 238 of the pages 234 can include random data blocks. At block 504, the first subset 236 of the pages 234 can be included in the pre-fetch plan 226 with a lesser amount of the sequential data blocks and a greater amount of the random data blocks. At block 506, the second subset 238 of the pages 234 can be included in the pre-fetch plan 226 with a greater amount of the sequential data blocks and a lesser amount of the random data blocks.

The source host machine 202 can use a sequential log 244 on the shared storage 206 to send random data blocks as sequential data. For example, based on determining that the cache migration request 225 is for the second subset 238 of the pages 234 which includes at least two random data blocks, the source host machine 202 can initiate writing the random data blocks sequentially to the sequential log 244 on the shared storage 206 such that the random data blocks can be sequentially pre-fetched from the sequential log 244 by the target host machine 204 as indicated at block 508. At block 510, the at least two random data blocks can be sequentially pre-fetched from the sequential log 244 by the target host machine 204.

As described herein, cache migration is different than VM migration in several respects. For example, cache migration includes block level data migration and not the migration of a state of a VM. Cache migration is a performance optimization that may result in improved data access speeds at VM start-up on a target machine and it does not have an impact on the correctness of the resulting VM that is executed on the target machine. VM migration where the entire system needs to be moved to the target machine is contrasted with cache migration where there is no requirement that the entire set of blocks in the source cache be pre-fetched. In cache migration, performance improvements may be realized by pre-fetching only a sub-set of the data into the local cache at the target machine. In addition, unlike VM migration, cache migration does not require convergence between the local cache at the target machine and the local cache at the source machine before the VM may be started on the target machine.

Figure 6:
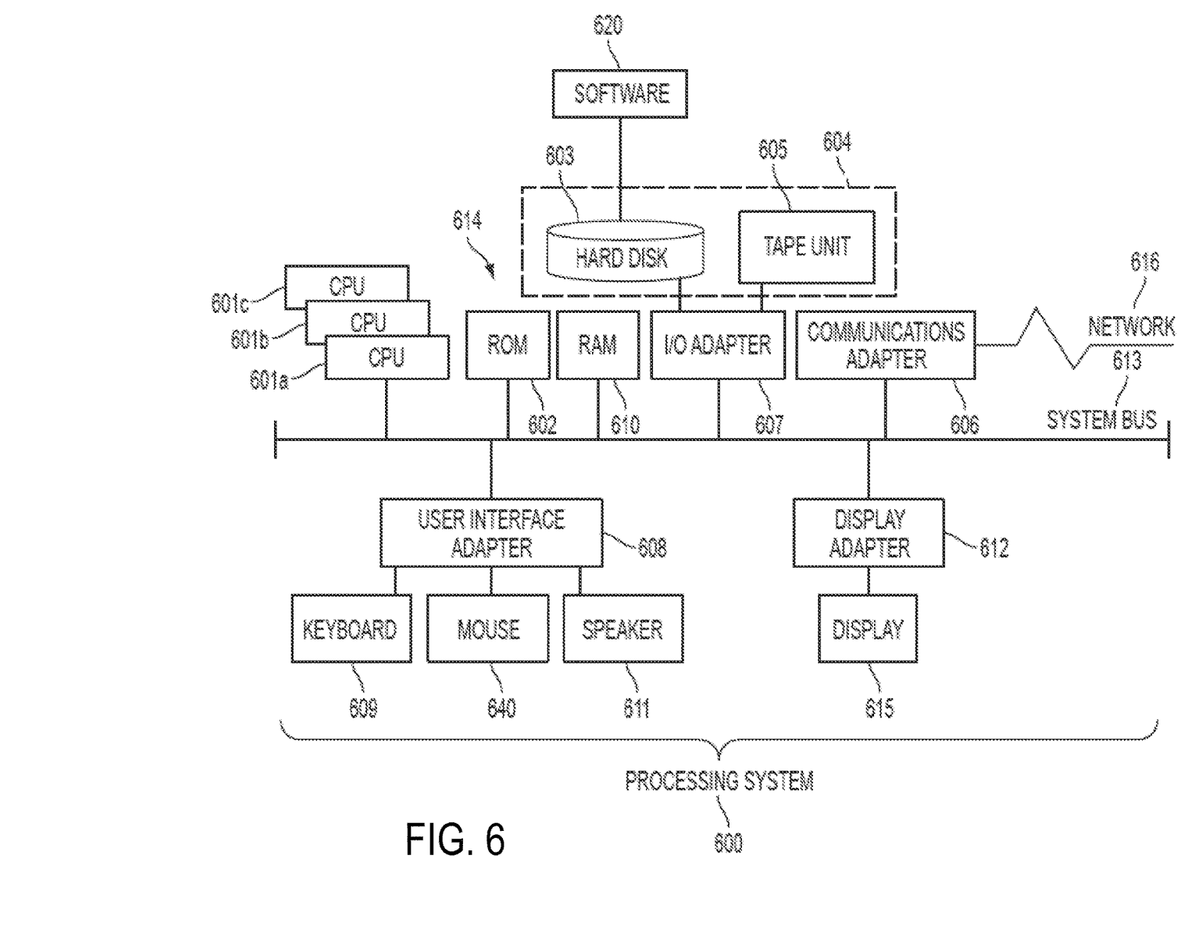
FIG. 6 depicts a processing system for practicing the teachings herein in accordance with an embodiment.

Referring now to FIG. 6, there is shown an embodiment of a processing system 600 for implementing the teachings herein. The processing system 600 is an example of part or all of a source host machine or a target host machine as previously referenced herein. In this embodiment, the processing system 600 has one or more central processing units (processors) 601a, 601b, 601c, etc. (collectively or generically referred to as processor(s) 601). Processors 601, also referred to as processing circuits, are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. The mass storage 604 is an example of a tangible storage medium readable by the processors 601, where the software 620 is stored as computer readable instructions for execution by the processors 601 to perform a method, such as one or more of the processes 300-500 of FIGS. 3-5. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system such as the AIX® operating system from IBM Corporation to coordinate the functions of the various components shown in FIG. 6. In addition, a portion the system memory 614 or hard disk 603 may be used for the local caches described herein, with the shared storage located on a storage device accessible by the processors 601 via the network 616.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    determining a plurality of pre-fetch hints associated with a source cache that is local to a source host machine, the source cache comprising a plurality of pages of cache data for a virtual machine on the source host machine;
    sending the pre-fetch hints to a pre-fetch planner to create a pre-fetch plan, the sending based on a migration of the virtual machine from the source host machine to a target host machine comprising a target cache that is local to the target host machine;
    creating the pre-fetch plan by the pre-fetch planner using a solver to establish a plurality of segments clustered between a plurality of random sets and sequential sets of the pages of cache data comprising a plurality of random data blocks and sequential data blocks based on the pre-fetch hints and a plurality of constraints, wherein clustering of the pages of cache data is based on a variation of utility determined for the pages and the solver is a linear programming solver that determines a fraction of the random and sequential sets to pre-fetch from a shared storage and the source cache within a time budget based on the utility;
    receiving, at the source host machine, a cache migration request based on the pre-fetch plan;
    sending a first subset of the pages from the source cache through a host-to-host communication channel to the target cache of the target host machine based on the cache migration request, wherein the first subset of the pages comprises a first combination of the sequential data blocks and the random data blocks including a lesser amount of the sequential data blocks and a greater amount of the random data blocks based on the pre-fetch plan; and
    sending a second subset of the pages from the source cache through a host-storage communication channel to the shared storage to be relayed to the target cache of the target host machine, wherein the second subset of the pages comprises a second combination of the sequential data blocks and the random data blocks including a greater amount of the sequential data blocks and a lesser amount of the random data blocks based on the pre-fetch plan.

2. The method of claim 1, wherein the pre-fetch hints include a priority order to indicate a suggested pre-fetching order.

3. The method of claim 1, wherein the source cache is not directly accessible by the target host machine.

4. The method of claim 1, further comprising:
    identifying dirty blocks in the source cache as one or more data blocks with a more recent version in the source cache than on the shared storage; and
    writing the dirty blocks back to the shared storage prior to sending the pre-fetch hints.

5. The method of claim 1, further comprising:
    based on determining that the cache migration request is for the second subset of the pages which comprises at least two random data blocks, writing the at least two random data blocks sequentially to a sequential log on the shared storage such that the at least two random data blocks can be sequentially pre-fetched from the sequential log by the target host machine.

6. A method comprising:
    receiving a plurality of pre-fetch hints associated with a source cache to migrate a virtual machine from a source host machine to a target host machine, the source cache comprising a plurality of pages of cache data for the virtual machine on the source host machine;
    creating a pre-fetch plan by a pre-fetch planner using a solver to establish a plurality of segments clustered between a plurality of random sets and sequential sets of the pages of cache data comprising a plurality of random data blocks and sequential data blocks based on the pre-fetch hints and a plurality of constraints, wherein clustering of the pages of cache data is based on a variation of utility determined for the pages and the solver is a linear programming solver that determines a fraction of the random and sequential sets to pre-fetch from a shared storage and the source cache within a time budget based on the utility;
    identifying a first subset and a second subset of the pages to transfer from the source cache to a target cache based on the pre-fetch plan, the source cache local to the source host machine and the target cache local to the target host machine; and
    sending a cache migration request to the source host machine based on the pre-fetch plan, wherein the first subset of the pages is pre-fetched from the source cache through a host-to-host communication channel based on the pre-fetch plan, the first subset of the pages comprises a first combination of the sequential data blocks and the random data blocks including a lesser amount of the sequential data blocks and a greater amount of the random data blocks based on the pre-fetch plan, the second subset of the pages is pre-fetched from the shared storage through a host-storage communication channel as relayed from the source cache in response to the cache migration request, and the second subset of the pages comprises a second combination of the sequential data blocks and the random data blocks including a greater amount of the sequential data blocks and a lesser amount of the random data blocks based on the pre-fetch plan.

7. The method of claim 6, wherein the pre-fetch hints include a priority order to indicate a suggested pre-fetching order.

8. The method of claim 6, wherein the source cache is not directly accessible by the target host machine.

9. The method of claim 6, wherein the pre-fetch plan includes one or more fetches from the source cache of one or more data blocks with a more recent version in the source cache than on the shared storage.

10. The method of claim 6, further comprising:
pre-fetching at least two random data blocks of the second subset of the pages from a sequential log on the shared storage as sequential data as written to the sequential log by the source host machine.

11. The method of claim 6, further comprising:
determining a utility level of data blocks identified in the pre-fetch hints; and
establishing assignments in the pre-fetch plan for the first subset and the second subset of the pages associated with the data blocks based on the utility level.

12. The method of claim 6, further comprising:
determining a first data transfer bandwidth from the source cache through the host-to-host communication channel to the target cache;
determining a second data transfer bandwidth from the source cache and the shared storage through the host-storage communication channel to the target cache; and
assigning the first subset and the second subset of the pages in the pre-fetch plan based on a combination of the first data transfer bandwidth, the second data transfer bandwidth, one or more data size constraints, and a predetermined virtual machine migration time budget.

13. A system comprising:
a source host processor in communication with a shared storage, the shared storage accessible by the source host processor and a target host processor;
a source cache in communication with and local to the source host processor, the source cache comprising a plurality of pages of cache data for a virtual machine on the source host processor; and
a memory having computer-readable instructions executable by the source host processor, the computer-readable instructions comprising:
determining a plurality of pre-fetch hints associated with the source cache;
sending the pre-fetch hints to a pre-fetch planner to create a pre-fetch plan, the sending based on a migration of the virtual machine from the source host processor to the target host processor;
receiving a cache migration request based on the pre-fetch plan created by the pre-fetch planner using a solver to establish a plurality of segments clustered between a plurality of random sets and sequential sets of the pages of cache data comprising a plurality of random data blocks and sequential data blocks based on the pre-fetch hints and a plurality of constraints, wherein clustering of the pages of cache data is based on a variation of utility determined for the pages and the solver is a linear programming solver that determines a fraction of the random and sequential sets to pre-fetch from the shared storage and the source cache within a time budget based on the utility;
sending a first subset of the pages from the source cache through a host-to-host communication channel to a target cache in communication with the target host processor based on the cache migration request, wherein the first subset of the pages comprises a first combination of the sequential data blocks and the random data blocks including a lesser amount of the sequential data blocks and a greater amount of the random data blocks based on the pre-fetch plan; and
sending a second subset of the pages from the source cache through a host-storage communication channel to the shared storage to be relayed to the target cache, wherein the second subset of the pages comprises a second combination of the sequential data blocks and the random data blocks including a greater amount of the sequential data blocks and a lesser amount of the random data blocks based on the pre-fetch plan.

14. The system of claim 13, wherein the pre-fetch hints include a priority order to indicate a suggested pre-fetching order.

15. The system of claim 13, wherein the source cache is not directly accessible by the target host processor.

16. The system of claim 13, wherein the first subset of the pages comprises a plurality of random data blocks, and the second subset of the pages comprises a plurality of sequential data blocks.

17. The system of claim 13, wherein the computer-readable instructions further comprise:
based on determining that the cache migration request is for the second subset of the pages which comprises at least two random data blocks, writing the at least two random data blocks sequentially to a sequential log on the shared storage such that the at least two random data blocks can be sequentially pre-fetched from the sequential log by the target host processor.

18. The system of claim 13, wherein the computer-readable instructions further comprise:
identifying dirty blocks in the source cache as one or more data blocks with a more recent version in the source cache than on the shared storage; and
writing the dirty blocks back to the shared storage prior to sending the pre-fetch hints.

* * * * *